United States Patent Office 2,836,032
Patented May 27, 1958

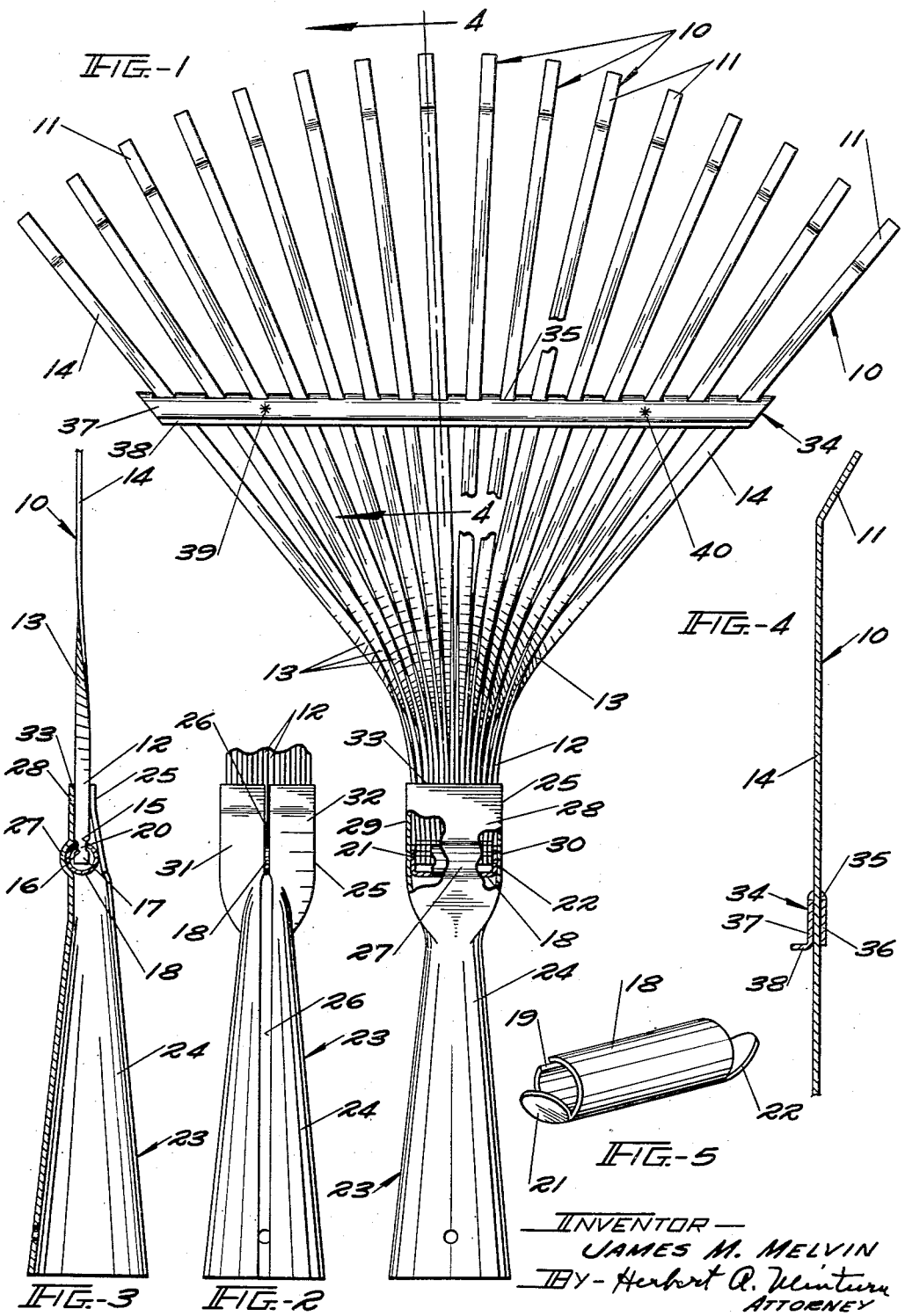

2,836,032

BROOM RAKE TINE MOUNTING

James M. Melvin, Elwood, Ind., assignor to Monticello Manufacturing Corporation, Elwood, Ind.

Application May 14, 1957, Serial No. 659,099

2 Claims. (Cl. 56—400.17)

This invention relates to a new structure for the mounting and retaining of the rear end of tines in a broom rake in a new and unique manner greatly simplifying the assembling and manufacturing of such rakes.

The structure constituting the invention permits the preassembling of the rear ends of the tines one against the other and holding them in that relation while the forward end of a handle ferrule is applied and fixed in position.

These and many other objects and advantages of the invention such as the unique association and relationship of the elements appearing in the appended claims, will become apparent to those versed in the art in the following description of one particular form of the invention as illustrated in the accompanying drawing, in which Fig. 1 is a view in top plan of a rake construction in partial section and embodying the invention;

Fig. 2 is a detail in bottom plan view of a handle receiving ferrule and engagement sheath about the tines;

Fig. 3 is a detail in vertical, central, longitudinal section through the ferrule and tine retaining means;

Fig. 4 is a detail in vertical section on the line 4—4 in Fig. 1; and

Fig. 5 is a view in perspective of the tine receiving capsule.

A plurality of individual tines generally designated individually by the numeral 10 are selected in number depending upon the desired lateral width of the rake, sixteen of such tines being herein shown in one particular example. Each of these tines has a front downturned finger end portion 11. Also each of the tines 10, made out of a spring-like metal, has a rear end portion 12 turned through a bend 13 to be in a plane at right angles to the major length 14 of the tine.

Each tine 10 is provided with opposite notches 15 and 16 entering from edges thereof leaving a rear end head 17, Fig. 3.

The heads 17 of the tines 10 are entered from an end and extend in the present example, throughout the length of a capsule 18. The circumferential width of a longitudinal slit 19 of the capsule 18 is made to be such that a neck portion of the tine designated by the numeral 20 may be inserted from the end of the capsule 18 through the slit 19 to have the head 17 carried within the capsule. By reason of the notches 15 and 16 being present, the opposing edges of the slit 19 will enter into those notches and thereby retain the heads 17 within the capsule against longitudinal displacement of the tines from the capsule.

The capsule 18 is made to have a length which will be substantially equal to the combined thicknesses of the tine portions 12 when laid one against the other through the capsule 18 as indicated in Fig. 1, and then end portions or closures 21 and 22 herein shown as being integral parts of the capsule 18 are bent upwardly and around over each end of the capsule so as to close those ends and thereby retain the heads 17 of the tines within the capsule.

A handle ferrule generally designated by the numeral 23 is herein shown as having a major frusto-conical length 24 to receive therein the tapered end of a handle (not shown) and carries by its forward end a sheath designated by the numeral 25 which has an opening entering therein from its forward end generally rectangular in shape. For ease in manufacturing and assembling of the various parts to be carried thereby, this ferrule 23 is made to have an under slit 26 extending throughout its length and continuing by a reduced width through the sheath 25, all on the underside of the ferrule 23.

The upperside of the sheath 25 is formed to have an arcuate portion 27 bowed outwardly from the topside 28, the curvature of this portion 27 conforming to the outer curvature of the capsule 18. The capsule 18 carrying the tines 10 as above indicated is laid across the inside of the sheath 25 to fit within the arcuate curved portion 27 thereof, and then the sheath 25 is folded around downwardly by the sides 29 and 30 and turned under the capsule 18 and the rear end portions 12 of the tines 10 by the opposing legs 31 and 32, the sheath 25 being formed snugly and tightly around the rear ends 12 of the tines 10 and against the capsule 18 from the underside by those legs 31 and 32 to compressibly retain the capsule across the arcuate portion 27 so that the tines 10 are thus effectively held against longitudinal travel in respect to the ferrule 23. The forward edge 33 of the sheath 25 is in close proximity to the beginnings of the curves 13 in the tines 10 as best indicated in Fig. 1.

In order to retain the tines 10 in their spaced apart relation to be useful in the raking operation, a spreader generally designated by the numeral 34 is provided with a slot 35 at regular intervals therealong, one tine 10 being received through each successive slot 35, and the spreader 34 is bent around from both top and bottom sides of the tines 10, Fig. 4, with an under smooth area 36 compressibly bearing against the undersides of the tines 10, a like area 37 bearing against the top sides of those tines 10, and from the rear of which area 37 there is preferably turned an upstanding flange 38 to insure rigidity of the spreader 34. The spreader 34 is fixed in position at the desired location along the lengths of the tines 10 as indicated in Fig. 1 by any suitable means, preferably by spot welding to at least two tines at the zones 39 and 40, Fig. 1.

Thus it is to be observed that a very simple, yet a most effective anchoring of the tines 10 in respect to the ferrule 23 is provided by the structure defined, and it is therefore respectfully urged that while there may be structural differences employed, within the spirit of the invention, it is desired that the scope of the invention be not limited to that precise form more than may be required by the following claims.

I claim:

1. A broom rake tine anchoring means comprising a plurality of tines each having a notch entering it from opposite sides, one side notch opposite the other side notch, adjacent an end of the tine defining a head by said end; a cylindrical capsule having a slit along one side with spaced apart marginal edges; said tines being stacked one against the other; said capsule surrounding the heads of said tines and said capsule edges entering said notches, one capsule edge across the notches on one side, and the other capsule edge across the notches on the other side of the respective tines, retaining the tines against longitudinal travel one in respect to the other; capsule end closures retaining the tine heads within said capsule against travel longitudinally of the capsule; a handle ferrule carrying said tines; a sheath carried by said ferrule and engaging said capsule, fixing it in position within the sheath crosswise of the ferrule.

2. The structure of claim 1 in which said sheath is rectangularly tubular extending from the ferrule to an open end and has top and bottom flat sides; and further has an upwardly bowing transverse portion extending laterally thereacross the top side of the sheath, into which portion said capsule fits, the bottom sheath side extending across and bearing against and urging the capsule into said sheath portion; said portion being spaced within said sheath from its open end to be adjacent said ferrule; said tines extending through and being held in said stacked relation by the length of said sheath.

References Cited in the file of this patent
UNITED STATES PATENTS

| | | |
|---|---|---|
| 1,706,507 | Withington | Mar. 26, 1929 |
| 1,879,925 | Dennis | Sept. 27, 1932 |
| 2,149,429 | Finkes | Mar. 7, 1939 |
| 2,472,342 | Rocquin | June 7, 1949 |